US010256948B2

(12) United States Patent
Leizerovich

(10) Patent No.: US 10,256,948 B2
(45) Date of Patent: *Apr. 9, 2019

(54) LOW LATENCY, AUTOMATIC REPEAT REQUEST ("ARQ") IN A MULTI-DEVICE COMMUNICATIONS LINK

(71) Applicant: MAXLINEAR ASIA SINGAPORE PRIVATE LIMITED, Singapore (SG)

(72) Inventor: Hanan Leizerovich, Petah Tikva (IL)

(73) Assignee: MAXLINEAR ASIA SINGAPORE PTE LTD (KR)

( * ) Notice: Subject to any disclaimer, the term of this patent is extended or adjusted under 35 U.S.C. 154(b) by 32 days.

This patent is subject to a terminal disclaimer.

(21) Appl. No.: 15/484,750

(22) Filed: Apr. 11, 2017

(65) Prior Publication Data

US 2017/0222760 A1     Aug. 3, 2017

Related U.S. Application Data

(63) Continuation of application No. 14/619,973, filed on Feb. 11, 2015, now Pat. No. 9,642,019.

(Continued)

(51) Int. Cl.
*H04L 1/08*     (2006.01)
*H04W 16/26*     (2009.01)
(Continued)

(52) U.S. Cl.
CPC ............. *H04L 1/08* (2013.01); *H04B 7/14* (2013.01); *H04L 1/1642* (2013.01); *H04L 1/188* (2013.01);
(Continued)

(58) Field of Classification Search
CPC . H04L 1/08; H04L 2001/0097; H04L 45/123; H04L 45/308; H04L 41/12;
(Continued)

(56) References Cited

U.S. PATENT DOCUMENTS 5,163,054 A    11/1992   Nagy
6,335,933 B1    1/2002   Mallory
(Continued)

FOREIGN PATENT DOCUMENTS

GB           2456913 A   *   8/2009            H04L 65/605

OTHER PUBLICATIONS

W. Ouyang, A. Eryilmaz and N. B. Shroff, "Scheduling in time-correlated wireless networks with imperfect CSI and stringent constraint," 53rd IEEE Conference on Decision and Control, Los Angeles, CA, 2014, pp. 6579-6584.*
(Continued)

*Primary Examiner* — Cynthia Britt
(74) *Attorney, Agent, or Firm* — McAndrews, Held & Malloy, Ltd.

(57) ABSTRACT

Systems and methods enable a plurality of modems in a microwave network receive a plurality of frames from a previous one of the plurality of modems and detect an error frame within the plurality of frames. The plurality of modems can be further configured to send a retransmission request to the previous modem upon detection of the error frame and transmit a dummy frame in place of the error frame to a next one of the plurality of modems.

19 Claims, 5 Drawing Sheets

Related U.S. Application Data

(60) Provisional application No. 61/941,690, filed on Feb. 19, 2014.

(51) Int. Cl.

| | | |
|---|---|---|
| *H04L 1/16* | (2006.01) | |
| *H04L 1/18* | (2006.01) | |
| *H04B 7/14* | (2006.01) | |
| *H04L 12/28* | (2006.01) | |
| *H04L 1/00* | (2006.01) | |

(52) U.S. Cl.
CPC ........ *H04L 1/1896* (2013.01); *H04L 12/2801* (2013.01); *H04W 16/26* (2013.01); *H04L 2001/0096* (2013.01)

(58) Field of Classification Search
CPC ......... H04L 41/22; H04L 41/24; H04L 41/26; H04L 12/2801; H04L 1/1642; H04L 1/188; H04L 1/1896; H04L 2001/0096; H04L 27/2014; H04L 27/2272; H04L 27/2276; H04L 5/22; H04W 72/0453; H04W 72/0486; H04W 76/025; H04W 84/042; H04W 92/045; H04W 16/18; H04W 40/08; H04W 40/20; H04W 84/18; H04W 84/22; H04W 16/26; G06F 11/3006; H04B 10/11; H04B 7/2123; H04B 7/14; Y10S 715/969
See application file for complete search history.

(56) References Cited

U.S. PATENT DOCUMENTS

| | | |
|---|---|---|
| 8,031,597 B2 | 10/2011 | Jung |
| 8,276,034 B2 | 9/2012 | Oikawa |
| 9,088,952 B2 * | 7/2015 | Leizerovich .......... H04W 52/26 |
| 9,642,019 B2 * | 5/2017 | Leizerovich .......... H04W 16/26 |
| 2004/0073929 A1 | 4/2004 | Morello |
| 2005/0094667 A1 | 5/2005 | Dahlman |
| 2013/0272217 A1 * | 10/2013 | Negus ....................... H04J 1/00 |
| | | 370/329 |

OTHER PUBLICATIONS

S. K. Biswas, H. C. Kim, P. Narasimhan, R. Siracusa and C. Johnston, "Design and implementation of data-link control protocol for CBR traffic in wireless ATM networks," Universal Personal Communications, 1998. ICUPC '98. IEEE 1998 International Conference on, Florence, 1998, pp. 833-839 vol. 2.*

M. Easton, "Design Choices for Selective-Repeat Retransmission Protocols," in IEEE Transactions on Communications, vol. 29, No. 7, pp. 944-953, Jul. 1981.*

* cited by examiner

LOW LATENCY, AUTOMATIC REPEAT REQUEST ("ARQ") IN A MULTI-DEVICE COMMUNICATIONS LINK

CROSS REFERENCE TO RELATED APPLICATIONS

This application is a continuation of U.S. patent application Ser. No. 14/619,973 filed Feb. 11, 2015, which claims the benefit of U.S. provisional patent application 61/941,960, filed on Feb. 19, 2014. The above-referenced United States patent applications are all hereby incorporated herein by reference in their entirety.

FIELD

Embodiments of the present disclosure provide systems and methods for a multi-device backhaul link topology, including an automatic repeat request ("ARQ") for such a topology.

BACKGROUND

A multi-device backhaul link topology in microwave networks can require communications links having a near-zero bit error rate ("BER"), i.e., $10^{-12}$ BER. That is, certain microwave networks cannot tolerate any transmission errors. These networks, however, also require low latency and low jitter. Typical links have a latency of a couple of hundred microseconds due to propagation delay. Microwave networks also include aggressive coding so recipient devices can correct any errors that may occur in the link by using error correction during decoding.

Backhaul links provide connectivity between base-stations or a base-station to a network. The receiver sensitivity at each base-station should be designed to accommodate for transmission losses in order to achieve the near-zero bit error rate. For example, the signal-to-noise ratio (SNR) at the receiver should be greater than 33 dB in order to achieve a $10^{-12}$ BER for a 1024 QAM constellation. To achieve the near-zero BER, a margin of 5 dB is typically included such that the target signal-to-noise ratio for the receiver design is 38 dB. Accordingly, a BER of $10^{-12}$ can be achieved even when fading or other losses occur. This margin also accommodates for phase hits or any other statistical impairments that cause frames to be disrupted.

Automatic repeat request ("ARQ") protocols are used in Long Term Evolution ("LTE"), wireless fidelity ("WI-FI"), and other communication applications. However, such protocols are not utilized in microwave networks because of the associated increased latency. ARQ protocols are usually generated at the receiver to acknowledge every frame that has been successfully received. Accordingly, when an acknowledgement is not sent or a recipient indicates a lack of acknowledgement, the transmitter knows to retransmit the corresponding frame. As a result, ARQ increases the latency and jitter in the communications link. To eliminate jitter, an internal buffer can be used at each node. When a frame is correctly received, it is transmitted to the next node. When such buffer is used and an error frame occurs, the network suffers from a constant latency and the network cannot continuously transmit on the link. That is, when a buffer is provided at each node, the overall latency is increased and the total latency is the summation of latencies at each one of the nodes.

BRIEF DESCRIPTION OF THE DRAWINGS

The present disclosure is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. In the following description, numerous specific details are set forth in order to provide a thorough understanding. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For purposes of this discussion, the term "module" shall be understood to include one of software, firmware, hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The exemplary embodiments described herein are provided for illustrative purposes, and are not limiting. Other exemplary embodiments are possible, and modifications can be made to the exemplary embodiments within the spirit and scope of the disclosure. Therefore, the Detailed Description is not meant to limit the disclosure. Rather, the scope of the disclosure is defined only in accordance with the following claims and their equivalents.

The present disclosure addresses transients introduced in a communications link that can cause phase or gain errors in the communications signal or any other very small probability communication errors. These transients or errors can increase the BER in microwave networks, making it difficult to achieve near-zero BER deployments. In embodiments, the present disclosure can address these phase and/or gain errors thereby reducing bit errors at the receiver. As a result, the system can be more tolerant of RF transient issues caused by, for example, temperature changes or electromagnetic interference (EMI). Furthermore, the present disclosure can increase system capacity by enabling the use of higher order data constellations with a lower signal-to-noise ratio (SNR), yet still providing near-zero BER as required by certain microwave backhaul.

Figure 1:
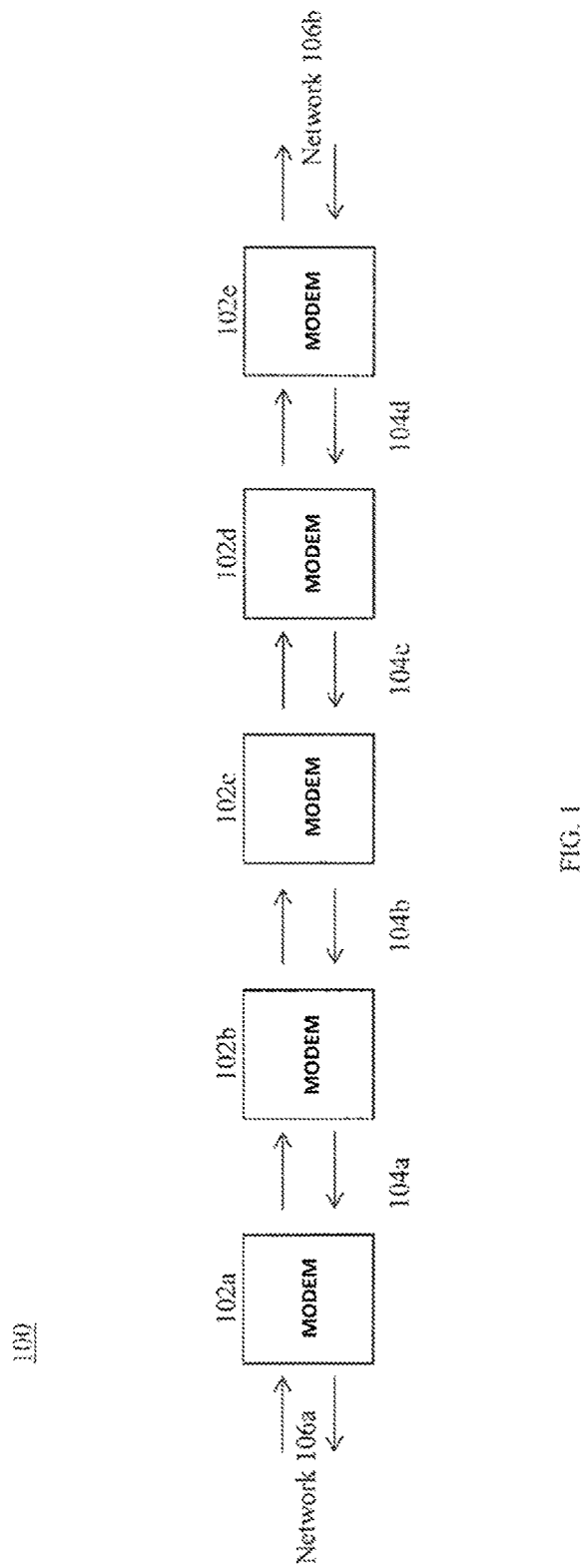
FIG. 1 shows a multi-link backhaul topology in a microwave network according to aspects of the present disclosure.

FIG. 1 illustrates a multi-device backhaul link topology 100 in a microwave network. More specifically, FIG. 1 shows a plurality of full duplex modems 102a-102e (also known as hops) connected via microwave links 104a-104d. Although FIG. 1 shows five full duplex modems, it should be understood by one of ordinary skill in the art that any number of full duplex modems are contemplated by the present disclosure. In embodiments, a first modem, e.g., modem 102a, and a last modem, e.g., modem 102e, can be connected to a network 106a, 106b, respectively, by a communications link that is wired or wireless. The network can be a user, a base station, a switch, etc.

In embodiments, full duplex modems 102a-102e transmit and receive a series of data frames to and from one another. That is, full duplex modems 102a-102e can be configured to receive data from a backhaul link via a first port (not shown) and deliver the data to a second port (not shown), and in parallel receive data from a different backhaul link via the second port and deliver the data to the first port. Accordingly, the modems 102a-102e can be described as "repeaters," as their function is to receive data frames from one "hop" and forward to the next hop. This may, or may not, require regeneration of the data frames at each hop. In this way, full duplex modems 102a-102e can be configured for bi-directional communications.

As a recipient, modems 102a-102e can be configured to detect data frames with errors. e.g., an "error frame", and send retransmission requests to the transmitter modem. In embodiments, a receiving modem detects an error frame by analyzing one or more received coded words. In this way, error frame detection can be achieved without acknowledgement ("ACK") overhead for each frame. A data frame is a collection of data that has been derived from network activity such as content production, consumption, and other user behavior. In response to the retransmission request, the transmitter modem can retransmit the frame. For example, when modem 102b detects an error frame from modem 102a, modem 102b sends a retransmission request to modem 102a. In turn, modem 102a resends the error frame to modem 102b. In embodiments, to achieve this automatic repeat request, each frame includes an identification number ("ID") or a serial number, and the retransmission request includes this II) or serial number. For example, each frame can include a header and a payload, and the ID can be in the header of each frame.

In embodiments, modems 102a-102e can include dummy frames, e.g., a null set data frame, in the series of data frames. For example, each modem in multi-device backhaul link topology 100 transmits an occasional dummy frame, e.g., every $10^{th}$ frame can be a dummy frame. The dummy frame can be a frame received from the previous modem in the topology or a self-generated frame. In embodiments, when an error frame occurs before a dummy frame is received, modems 102a-102e can generate a dummy frame to be sent instead of forwarding the error frame.

When an error frame is detected, the recipient modem frame will transmit an upcoming dummy frame that is not currently scheduled to be transmitted, rather than the error frame to the next modem, while simultaneously sending a retransmission request to the previous modem. In other words, the dummy frame will be sent ahead of schedule. Upon receipt of the retransmission request, the previous modem resends the error frame, and replaces an upcoming dummy frame with a data frame. Retry requests can include the frame number or ID of the error frame for retransmission. In embodiments, each modem holds a record of 'N' previously sent frames in order to be able to perform retransmission upon request.

In embodiments, a latency of multi-device backhaul link topology 100 is the latency caused by receipt of an error frame and the retransmission of the frame. In embodiments, the present disclosure only requires a buffer in the end modems in the topology, i.e., modem 102a or 102e, rather than a buffer in each intermediate modem 102a-102e. That is, modems 102a-102e forward a buffer in the series of data frames, and as such, a buffer is only required at a final modem. As a result, the latency of multi-device backhaul link topology 100 is the worst-case latency of one of the modems 102a-102e. When a retransmission occurs, latency due to the retransmission occurs; however, multi-device backhaul link topology 100 continues to transmit the data frames, and as such, there is no additional latency. In this way, multi-link backhaul topology 100 can be configured to absorb latency caused by an occasional error frame. In embodiments, the latency can be calculated based on the following equations:

$$\text{old\_latency} = \text{sum(link distances)} \cdot \text{speed\_of\_light} + \\ \text{(total number of links)} \cdot (\text{frame\_time} + \text{frame\_tx\_processing\_time} + \text{frame\_rx\_processing\_time}) \quad \text{Equation (1)}$$

$$\text{new\_latency} = \text{old\_latency} + [2 \cdot \text{max(link distances)} \\ \cdot \text{speed\_of\_light} + 2 \cdot \text{frame\_time} + 2 \cdot \text{frame\_tx\_processing\_time} + 2 \cdot \text{frame\_rx\_processing\_time}] \\ \cdot \text{max\_number\_of\_allowed\_errors} \quad \text{Equation (2)}$$

In embodiments, each of the end modems, e.g., modem 102a or modem 102e, in the multi-device backhaul link topology 100 gathers the data frames in a fixed first-in, first out fashion, and sends the frame to the network in-order (or out of order according to the network demands). The FIFO methodology makes sure no "holes" are sent to the network, in case a missing frame is found that is received later. Performance can be checked by intentionally sending an error frame and determining if the error frame is received by the recipient hop.

Figure 2:
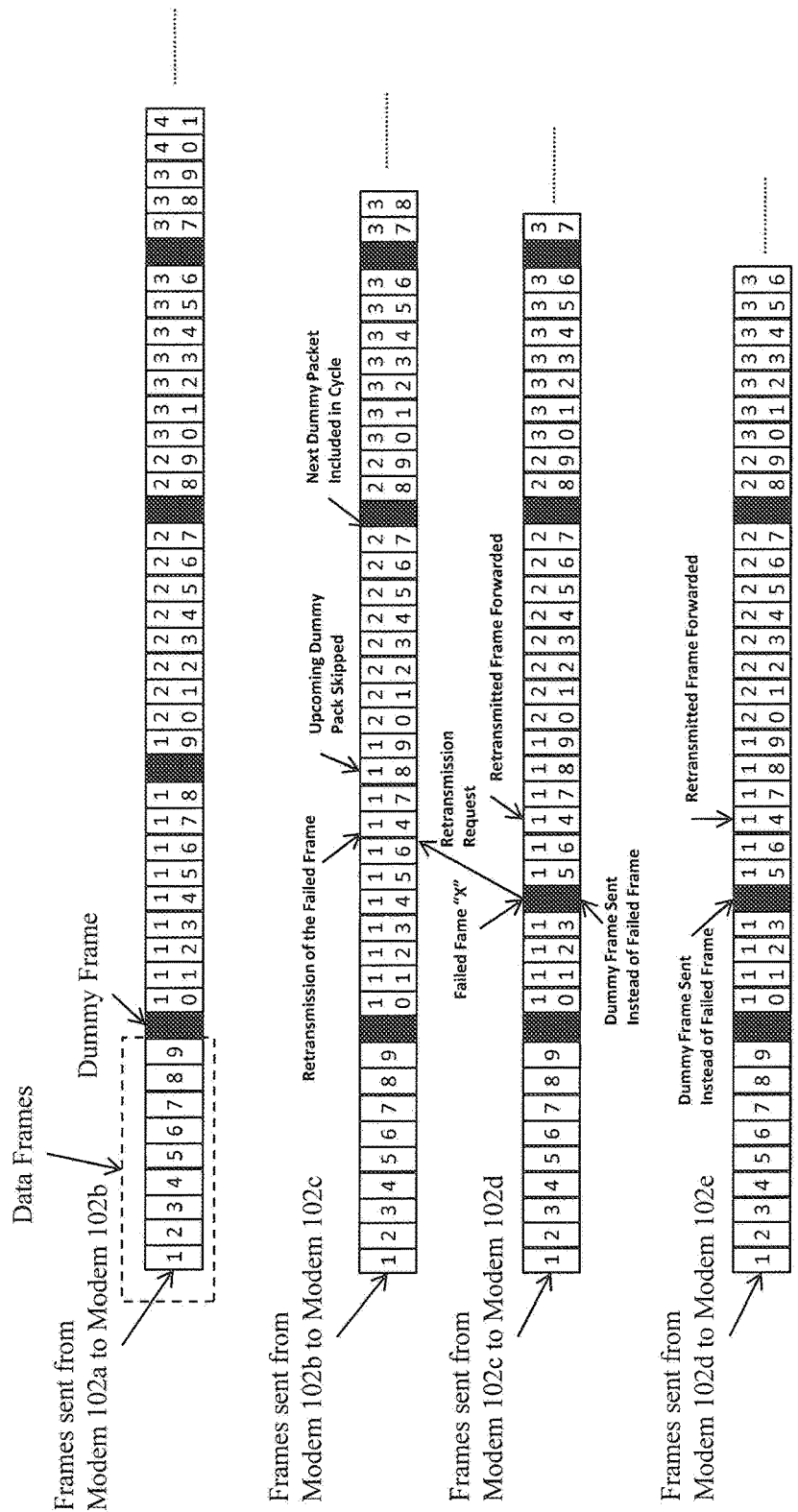
FIG. 2 shows an example of a protocol for implementing an automatic repeat request in a microwave network according to aspects of the present disclosure.

FIG. 2 shows an example of a protocol for implementing an automatic repeat request in a microwave network of a communications link. FIG. 2 shows a series of data frames, e.g., frames 1-9, and a dummy frames, e.g., blacked out frames that as scheduled for transmission from one modem to another in FIG. 1, in repeater fashion. As shown in FIG. 2, modem 102a transmits a series of frames to modem 102b, and can be stored in a queue (e.g. memory) at each modem, from which the frames are transmitted at pre-scheduled time slots. A dummy frame is periodically included in the series of frames, e.g., every $10^{th}$ frame is a dummy frame. However, it should be understood by those of ordinary skill in the art that the dummy frame can be included at any $n^{th}$ frame. As further shown, modem 102b transmits the series of frames to modem 102c; however, modem 102c detects an error frame "X", e.g., the $5^{th}$ frame (i.e., [1,4]) after a first buffer is an error frame. As a result, modem 102c sends a retransmission request to modem 102b, and modem 102c simultaneously sends a dummy frame to modem 102d instead of the error frame X.

Upon receipt of the retransmission request, modem 102b replaces an upcoming frame with a retransmission of the error frame (i.e., [1,4]) and continues with the transmission of the upcoming scheduled frames. In embodiments, rather than sending a scheduled dummy frame, modem 102b continues with the transmission of data frames. That is, to accommodate for the retransmission of the error frame, modem 102b continues with the transmission of frames and omits an upcoming dummy frame. For example, in the FIG. 2, frame [1,8] is sent by modem 102b instead of the scheduled dummy frame.

Upon receipt of the retransmitted frame, modem 102c forwards the retransmitted frame and continues to transmit the frames to modem 102d as they are received from modem 102b. In turn, modem 102d continues to transmit the frames to modem 102e (not shown) as they are received. Modem 102e receives all the frames with their frame numbers in a first in, first out (FIFO) order, reorders them and delivers them to the network (as shown in FIG. 1) by order, with fixed latency according to the longest retransmission time.

Accordingly to the ACK protocol in FIG. 2, once a modem detects a received error frame, the modem sends a retransmission request to the previous modem that originated the error frame, and sends an unscheduled dummy frame to the subsequent modem as a replacement for the error frame. Once the previous modem receives the retransmission request, the modem uses the next transmission frame to fulfill the transmission request to resend the error frame, and then continues the ordered transmission of the following scheduled frames, except that the next scheduled dummy frame is replaced with an actual data frame.

Figure 3:
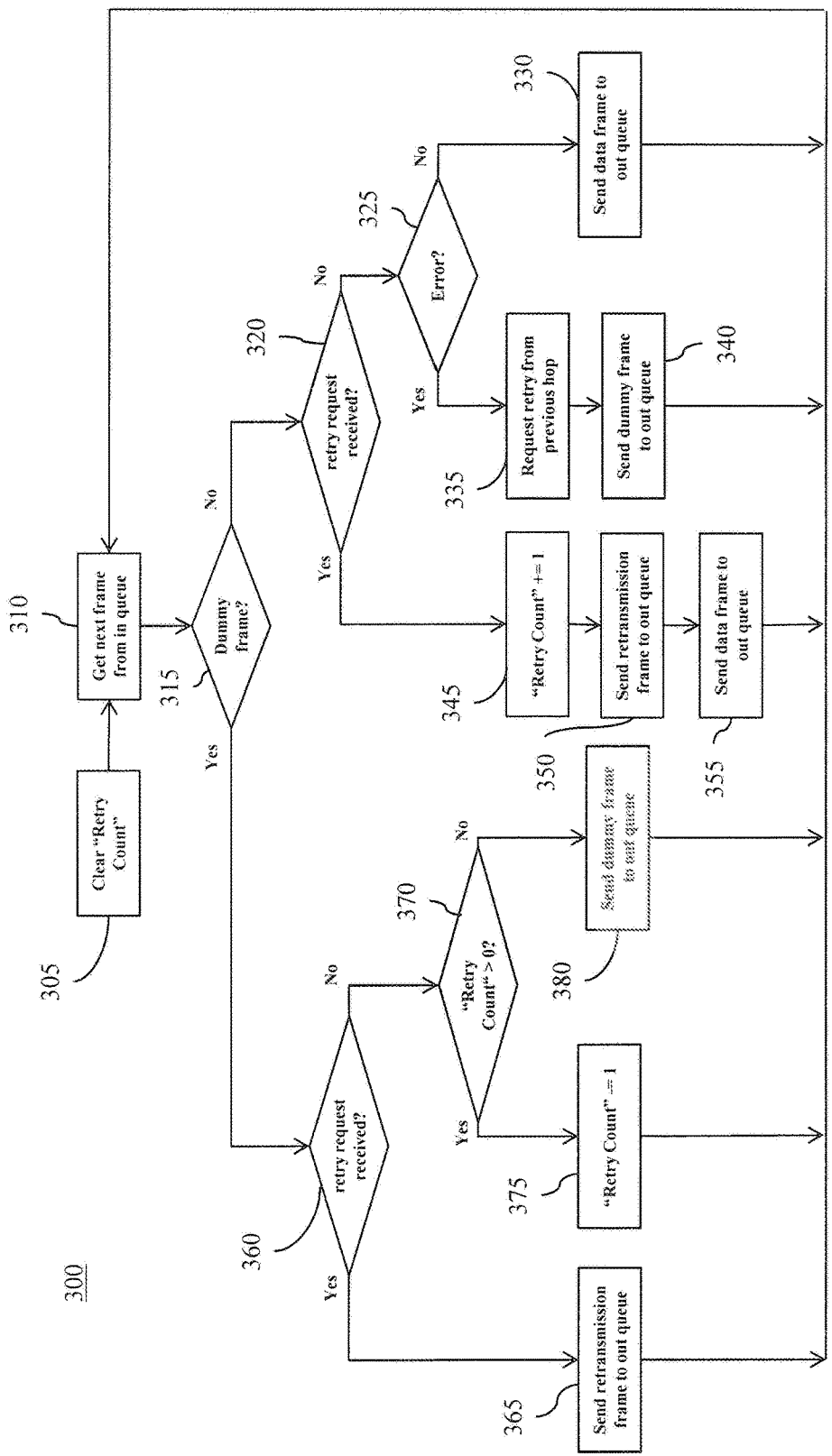
FIG. 3 is a flowchart depicting a method of utilizing an automatic repeat request in a microwave network according to aspects of the present disclosure.

FIG. 3 shows a flowchart depicting a method 300 of utilizing an automatic repeat request in a microwave network. For example, method 300 can be implemented in the system and arrangement of FIGS. 1-2. It is to be appreciated that not all operations shown are required for method 300, and the operations may not occur in the order shown.

Method 300 includes clearing a "retry count" after synchronization, e.g., synchronization between networks, at block 305. Next, a next frame in a series of data frames is retrieved from an input queue (e.g. memory) at block 310, and at block 315, the method 300 includes determining whether the frame is a dummy frame.

When the frame is not a dummy frame, the method 300 includes determining whether a retry request has been received at block 320. If a retry request has not been received, the method 300 further includes determining whether an error frame has occurred (i.e. received) at block 325. If not an error frame, the valid data frame is sent to an output queue (e.g. memory) for transmission to the next hop at block 330. If an error frame was received, a retransmission request is sent to the modem at the previous hop at block 335 and a dummy frame is transmitted to the output queue instead of the error frame at block 340, where the dummy frame is sent to the subsequent hop instead of the error frame.

If a retry request has been received, the "retry count" is increased by a '1' count at block 345 and a retransmission frame (e.g. previously transmitted but received in error at the next hop) is sent to the out queue at block 350. Next, the retransmission frame is sent to the out queue at block 355.

When a dummy frame is received at block 325, the method 300 includes determining whether a retry request has been received at block 360. If a retry request has been received, a retransmitted frame is sent to the output queue at block 365. Alternatively, when a retry request has not been received, the method 300 includes determining whether the "retry count" is greater than 0 at block 370. When the "retry count" is greater than 0, the "retry count" is decreased by a '1' count at block 375. A dummy frame is sent to the out queue at block 380 when the "retry count" is not greater than zero.

After blocks 330, 340, 355, 365, 375, and 380, the method 300 continues again at block 310. That is, the method 300 is performed iteratively for each frame of the series of data frames.

Figure 4:
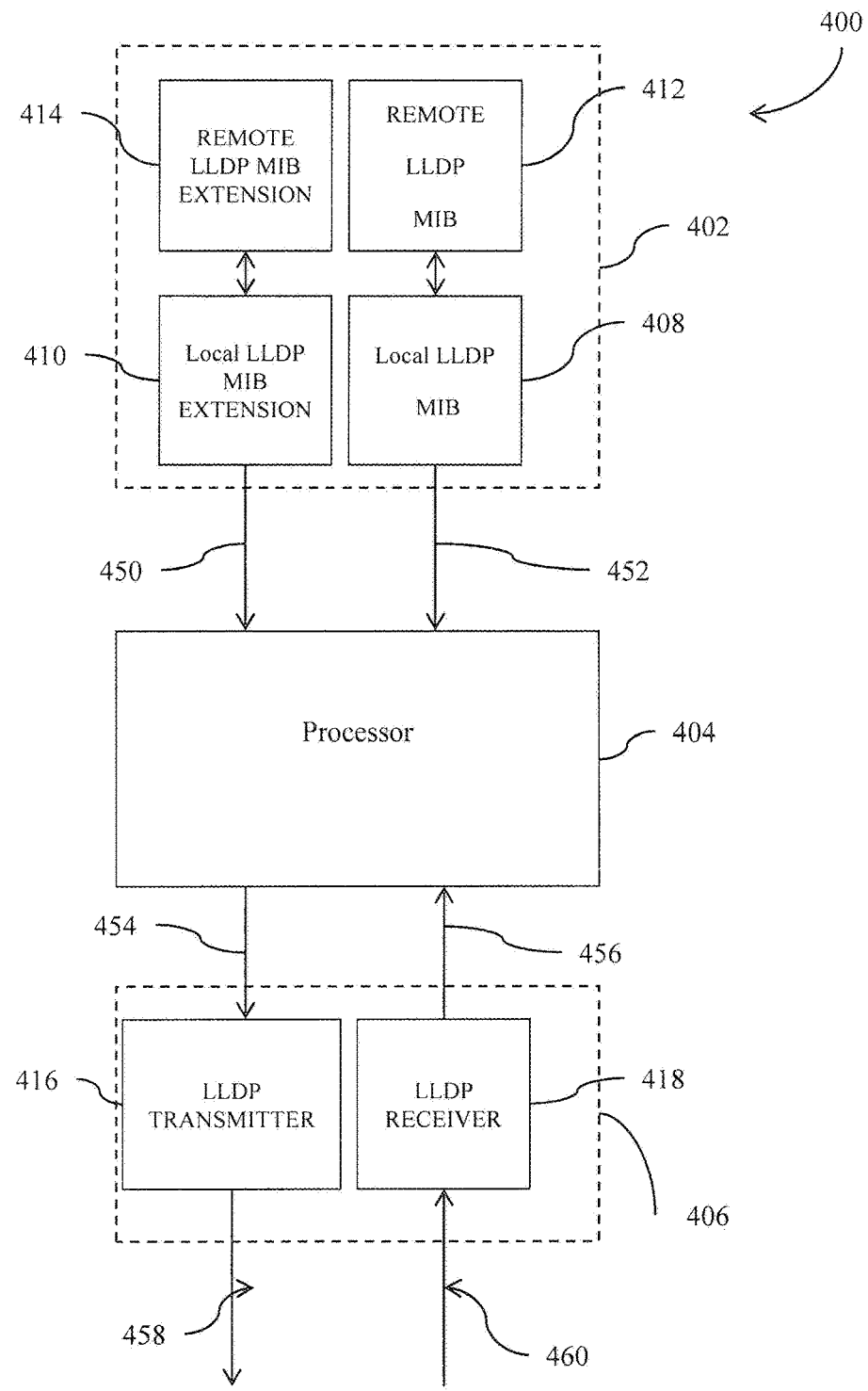
FIG. 4 shows is a block diagram of a transceiver module that can be implemented as part of the microwave network according to aspects of the present disclosure.

FIG. 4 is a block diagram of a modem 400 that can be implemented as part of the multi-link backhaul topology 100 according to aspects of the present disclosure described herein. For example, modem 400 can an exemplary embodiment of each modem 110-150 of FIG. 1, for transmitting and/or receiving one or more data and dummy frames as illustrated in FIGS. 2-3 and described in the corresponding text. The modem 400 includes a Link Layer Delivery Protocol ("LLDP") memory module 402, a processor 404, and an LLDP physical layer device (PRY) 406. In embodiments, processor 404 can be implemented as an LLDP media access controller (MAC).

The LLDP memory module 402 manages and/or stores information contained in the one or more LLDP data frames into various data stores, such as a local management information base (MIB) and/or a remote MIB. The LLDP memory module 402 includes a local LLDP MIB 408, an optional local LLDP MIB extension 410, a remote LLDP MIB 412, and/or an optional remote LLDP MIB extension 414. The identity of the local device, the capabilities of the local device and/or the neighbors of the local device which are specified by the LLDP are stored within the local LLDP MIB 408.

Processor 404 can perform Layer 2 MAC functionality such as error correction/detection, encapsulating/de-encapsulating, routing, and other processing according to the LLDP. The processor 404 can detect an error frame and send the retransmission request using the PHY 406, and generate and transmit data frames and dummy frames as described herein using PHY 406. The processor 404 can process the error frames using Layer 2 functionality to provide one or more LLDP data frames 454 to the LLDP PHY 406 for transmission over the link communications medium. The processor 404 can process one or more LDDP frames 456 that are received from the LLDP PHY 406 using the Layer 2 functionality. In an embodiment, the processor 404 can detect an error frame by examining one or more coded words in the plurality of frames, without decoding or determining message content. For example, cyclic redundancy check (CRC) or other error schemes can be used without decoding or examining message content. Accordingly, no ACK procedure is necessary for detecting an error frame.

The LLDP PHY 406 provides an electrical, a mechanical, and/or a procedural interface to the communications medium, so as to communicate the one or more LLDP data frames between the local and the remote modems. The LLDP PHY 406 can perform Layer 1 physical layer (PHY) functionality such as modulation/demodulation, equalization, frequency translation, multiplexing, and other processing according to the LLDP. The LLDP PHY 406 includes an LLDP transmitter 416 and an LLDP receiver 418. The LLDP transmitter 416 can process the one or more LLDP data frames 454 using the Layer 1 functionality to provide a transmit signal 458 for communication to a remote modem over the communications medium. The LLDP receiver 418 can process a receive signal 460 that is received from the remote modem using the Layer 1 functionality to provide the one or more LLDP data frames 456.

Figure 5:
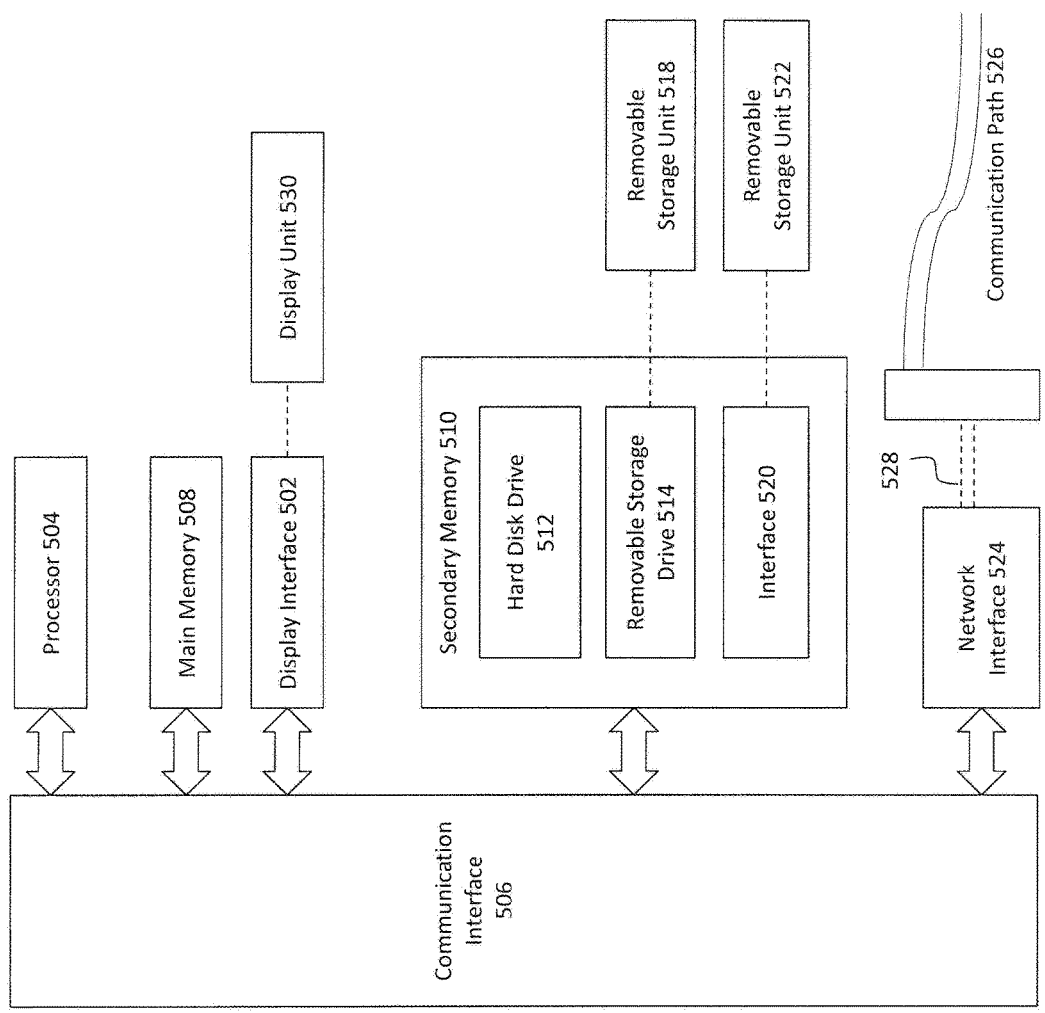
FIG. 5 illustrates one or more processors according to aspects of the present disclosure.

Various aspects of the present disclosure can be implemented by software, firmware, hardware, or a combination thereof. FIG. 5 illustrates an example computer system 500 in which the present disclosure, or portions thereof, can be implemented as computer-readable code. For example, at least portions FIGS. 2-4 can be implemented by computer system 500. Various embodiments of the disclosure are described in terms of this example computer system 500. After reading this description, it will become apparent to a person skilled in the relevant art how to implement the disclosure using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present disclosure as discussed herein. In particular, the computer programs, when executed, enable processor 504 to implement the processes of the present disclosure. Accordingly, such computer programs represent controllers of the computer system 500. Where the disclosure is implemented using software, the software may be stored in a computer program product and loaded into computer system 500 using removable storage drive 514, interface 520, hard drive 512 or communications interface 524.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), among others.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance provided herein.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and the like. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It is to be appreciated that the Detailed Description section, and not the Abstract section, is intended to be used to interpret the following claims. The Abstract section may set forth one or more, but not all exemplary embodiments, of the disclosure, and thus, are not intended to limit the disclosure and the appended claims in any way.

What is claimed is:

1. A repeater, the repeater comprising:
a memory configured to store a plurality of frames comprising data frames and dummy frames, wherein a transmission schedule for four frames of the plurality of frames comprises the following order: a first data frame, a second data frame, a first dummy frame, and a third data frame;
a receiver configured to detect a retransmission request for the first data frame; and
a transmitter configured to retransmit the first data frame in replacement of the second data frame, wherein the second data frame is transmitted immediately after the first data frame, the a third data frame is transmitted immediately after the second data frame, and the first dummy frame is removed from the transmission schedule.

2. The repeater of claim 1, wherein a second dummy frame is scheduled after the third data frame.

3. The repeater of claim 1, wherein the first data frame and second data frame are received by the repeater before the first dummy frame.

4. The repeater of claim 3, wherein the third data frame is received by the repeater after the first dummy frame.

5. The repeater of claim 1, wherein each of the plurality of frames includes an identification number ("ID") or a serial number, and the retransmission request includes the ID or serial number of the first data frame requested for retransmission.

6. A repeater, the repeater comprising:
a transceiver configured to receive a plurality of frames from a previous modem of a plurality of modems and transmit the plurality of frames to a subsequent modem of the plurality of modems according to a transmit schedule; and
a memory to store the plurality of frames,
wherein the transceiver is configured to:
detect an error frame in the plurality of frames that was received from the previous modem;
send a retransmission request for the error frame to the previous modem using the transceiver;
transmit a first dummy frame in replacement of the error frame to the subsequent modem using the transceiver;
transmit a data frame in place of a second dummy frame that is scheduled for a future transmission to the subsequent modem; and
remove the second dummy frame from the transmission schedule.

7. The repeater of claim 6, wherein the transceiver is configured to examine a coded word in the plurality of frames from the previous modem to detect the error frame, without decoding for message content.

8. The repeater of claim 6, wherein the transceiver is configured to:
receive a replacement data frame from the previous modem, and
transmit the replacement data frame for the error frame.

9. The repeater of claim 8, wherein the replacement data frame is transmitted during a time another data frame was scheduled for transmission to the subsequent modem.

10. The repeater of claim 6, wherein each of the plurality of frames includes an identification number ("ID") or a serial number, and the retransmission request includes the ID or serial number of the error frame requested for retransmission.

11. A method of operating a communications link having a plurality of modems, the method comprising:
receiving, at a first modem, a series of data frames from a second modem in the communications link, wherein the series of data frames comprises a dummy frame;
generating, at the first modem, a transmission schedule for transmitting the series of data frames and the dummy frame;
determining whether a first data frame of the series of data frames is an error frame;
sending a retransmission request to the second modem if the first data frame is an error frame;
removing the dummy frame from the transmission schedule if the first data frame is an error frame; and
rescheduling a second data frame of the series of data frames to be transmitted instead of the dummy frame if the first data frame is an error frame.

12. The method of claim 11, wherein the second modem is a previous modem in the plurality of modems relative to the first modem, and wherein the third modem is a subsequent modem in the plurality of modems relative to the first modem.

13. The method of claim 11, wherein each of the series of data frames includes an identification number ("ID") or a serial number, and the retransmission request includes the ID or serial number of the data frame requested for retransmission.

14. The method of claim 11, wherein the method comprises:
retransmitting, at the second modem, the first frame upon receiving the retransmission request.

15. The method of claim 14, wherein the retransmission of the first frame is during a time a third data frame from the series of data frames was scheduled for transmission.

16. The method of claim 15, wherein the method comprises:
receiving, at the first modem, the retransmission of the error frame; and
transmitting, at the first modem, the retransmission of the error frame to the third modem.

17. The method of claim 16, wherein the third modem is an end modem of the plurality of modems, wherein the method comprises:
receiving, at the third modem, the series of frames from the first modem, including the retransmission of the error frame; and
reordering the series of frames to correct the order of the retransmitted data frame in the received series of data frames.

18. The method of claim 17, comprising delivering the reordered data frames to a network.

19. The method of claim 11, wherein the determining whether the data frame is an error frame comprises examining a coded word carried in the plurality of frames for an error, without decoding for message content.

* * * * *